United States Patent [19]
Yasugahira et al.

[11] 3,863,608
[45] Feb. 4, 1975

[54] STEAM HEATING APPARATUS WITH MOISTURE SEPARATORS

[75] Inventors: Norio Yasugahira; Kuniyoshi Tsubouchi; Takeshi Sato; Akira Uenishi, all of Hitachi, Japan

[73] Assignee: Hitachi, Ltd., Tokyo, Japan

[22] Filed: Aug. 20, 1973

[21] Appl. No.: 389,820

[30] Foreign Application Priority Data
Aug. 23, 1972  Japan.................................. 47-83783

[52] U.S. Cl..................... 122/483, 122/34, 55/440
[51] Int. Cl............................................. F22g 1/00
[58] Field of Search........ 122/34, 483; 55/442, 440, 55/443; 165/78

[56] References Cited
UNITED STATES PATENTS

| | | | |
|---|---|---|---|
| 3,593,500 | 7/1971 | Ritland et al....................... | 122/483 |
| 3,667,430 | 6/1972 | Hubble et al....................... | 122/483 |
| 3,712,272 | 1/1973 | Carnavos............................ | 122/483 |

*Primary Examiner*—Kenneth W. Sprague
*Attorney, Agent, or Firm*—Thomas E. Beall, Jr.

[57] ABSTRACT

For drying and superheating steam, particularly between the outlet of a high pressure turbine and to the inlet of a low pressure turbine, there is provided an elongated tubular pressure vessel disposed horizontally with a pair of end plates to generally close the same, a series of steam heaters arranged in the upper half of the vessel to extend axially with respect to the vessel with predetermined spacings between them for the passage therebetween of the steam to be heated, and a plurality of moisture separators or dryers each disposed in the lower half of the tubular pressure vessel at opposite ends of each of the steam heaters. Moisture laden steam exiting from a high pressure turbine will enter the pressure vessel at a plurality of steam inlets, each of which is provided at a position adjacent and leading to the plurality of moisture separators, respectively, and in the upper portion of the pressure vessel. After passage through the moisture separators, where the steam is dried, the steam will pass through the steam heaters to be discharged from the pressure vessel through steam outlets disposed near the central portion of each of the steam heaters. As the heating fluid for the steam heaters, live steam from a reactor may be employed or some of the steam extracted from the high pressure turbine may be employed.

10 Claims, 2 Drawing Figures

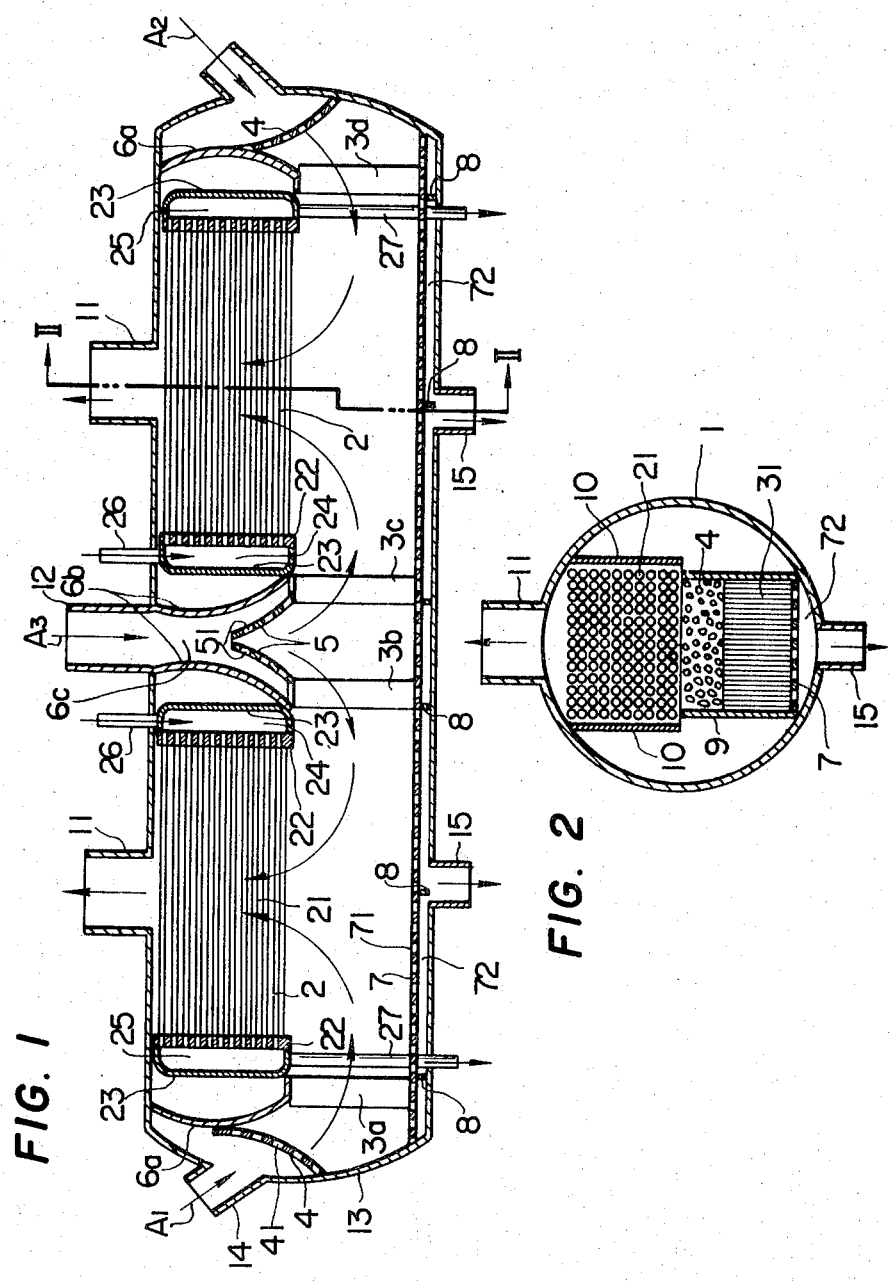

STEAM HEATING APPARATUS WITH MOISTURE SEPARATORS

BACKGROUND OF THE INVENTION

The present invention relates to steam heating apparatus with moisture separators, wherein the moisture is separated from the moisture laden steam after the steam has undergone expansion through a high pressure turbine of a steam turbine power plant, so that the steam may be dried even though it will be still saturated steam, and thereafter the dried saturated steam will be reheated to a superheated condition so that it may be used in a subsequent low pressure steam turbine.

In atomic power plants under construction of in operation at the present time, a boiling water reactor or a pressurized water reactor is usually employed to produce steam as a motive fluid. It is anticipated that this tendency for the adoption of such reactors will continue for some time. Steam generated through this type of reactor has a steam condition wherein the steam is approximately one-third of the pressure of that generated through a boiler in a large scale conventional thermoelectric power plant, and approximately one-half in temperature. The reactors are designed optimumly for such steam conditions. The steam generated in the reactor is introduced into a high pressure turbine under conditions where the entry steam contains a little moisture, and after the steam has passed through the high pressure turbine with expansion, the steam exits from the turbine as moisture laden steam having 12 to 13 percent moisture therein. In such an operation, if this steam with considerable moisture undergoes further expansion in a low pressure turbine, the steam will have far greater moisture content at the outlet of the low pressure turbine than would steam in a conventional thermoelectric power plant. An increase of 1 percent of moisture induces a decrease of 1 percent of stage efficiency for a turbine, which results in not only a drop in turbine efficiency, but also the possibility of inflicting considerable damage to the turbine power plant due to the danger of erosion of the turbine blades caused by the excess moisture.

Therefore, up to the present, it has been known to dry the steam by arranging steam-moisture separating apparatus between the high pressure turbine and the low pressure turbine, or by providing an apparatus for removing moisture in the low pressure turbine. However, this has not proved satisfactory in view of thermal efficiency. In addition, as the atomic power plant tends to have a large capacity according to desired electrical output of the plant, which is a rapidly increasing tendency, the amount of the steam treated in the plant correspondingly becomes quite large. In prior apparatus, this condition results in apparatus that is quite large and produces a corresponding rise in cost so that the steam to be treated may be great, but the thermal efficiency is not satisfactory.

SUMMARY OF THE INVENTION

It is an object of the present invention to provide an economical steam heating apparatus, with respect to the entire steam turbine power plant. The steam heating apparatus with moisture separators is simple in construction and serves the purpose of increasing steam turbine power plant efficiency, and further is constructed so that the piping to and from the turbines is quite simple and advantageous.

For drying and superheating steam, particularly between the outlet of a high pressure turbine and to the inlet of a low pressure turbine, there is provided an elongated tubular pressure vessel disposed horizontally with a pair of end plates to generally close the same, a series of steam heaters arranged in the upper half of the vessel to extend axially with respect to the vessel with predetermined spacings between them for the passage therebetween of the steam to be heated, and a plurality of moisture separators or dryers each disposed in the lower half of the tubular pressure vessel at opposite ends of each of the steam heaters. Moisture laden steam exiting from a high pressure turbine will enter the pressure vessel at a plurality of steam inlets, each of which is provided at a position adjacent and leading to the plurality of moisture separators, respectively, and in the upper portion of the pressure vessel. After passage through the moisture separators, where the steam is dried, the steam will pass through the steam heaters to be discharged from the pressure vessel through steam outlets disposed near the central portion of each of the steam heaters. As the heating fluid for the steam heaters, live steam from a reactor may be employed or some of the steam extracted from the high pressure turbine may be employed.

BRIEF DESCRIPTION OF THE DRAWINGS

Further objects, features and advantages of the present invention will become more clear from the following detailed description of a preferred embodiment, as shown in the accompanying drawings, wherein:

FIG. 1 is a front elevation cross sectional view showing a preferred embodiment of the present invention; and FIG. 2 is a cross sectional view taken along line II—line II of FIG. 1.

DETAILED DESCRIPTION OF THE INVENTION

In FIGS. 1 and 2, there is shown the preferred embodiment of the steam heating apparatus with moisture separators according to the present invention, which will be described hereinafter.

The steam heating apparatus with moisture separators comprises an elongated tubular pressure vessel 1, a pair of steam heaters or heat exchangers 2, a plurality of moisture separators or steam dryers 3, and a plurality of various parts attached thereto to produce an operative assembly. The elongated tubular pressure vessel 1 has a pair of end plates 13, at each axial end thereof, which plates are convex in form and generally seal the pressure vessel except for inlets and outlets to be described below. A steam inlet 14 is provided in the upper portion of each of the end plates 13, and a further steam inlet 12 is disposed in the upper portion of the pressure vessel 1 between the pair of steam heaters 2. A pair of steam outlets 11 are each provided in the upper portion of the pressure vessel 1 directly above and opposite each central portion of the steam heaters 2, respectively. A pair of water drains 15 are disposed in the lower portion of the pressure vessel 1.

Each of the steam heaters 2 is mounted by a pair of axially extending partitions 10, FIG. 2, that are secured by suitable means to the upper portion of the pressure vessel 1, with the axial extent and spacing of the partitions 10 being suitable to form the side axially extending closures for the steam heaters 2. Each of the steam heaters includes a plurality or bundle of heat exchange tubes 21 that are mounted at their opposite axial ends in tube sheets 22 for supporting the tubes 21 in the spaced array as shown in FIG. 2, for sealing the ends of the tubes 21 with respect to the remainder of the pressure vessel interior and further for providing fluid access thereto. A steam chamber 24 is formed at the inner end of each of the steam heaters 2 as defined by the associated tube sheet 22 and a partition wall 23. Each of the inlet steam chambers 24 is provided with a steam inlet 26 projecting downwardly through the outer shell of the pressure vessel 1 and the partition 23. A condensed water chamber 25 is provided at the outer end of each of the steam heaters 2 and is defined by the associated tube sheet 22 and a further partition wall 23 which has a drain outlet 27 projecting downwardly from the interior of the condensed water chamber 25 through the partition 23 and through the pressure vessel 1.

A plurality of moisture separators or steam dryers $3a$, $3b$, $3c$, and $3d$ are disposed in the space under the end portions of the steam heaters 2. The moisture separators $3a$ and $3d$ are each securely mounted within the pressure vessel 1 by being fixed to partitions $6a$, which partitions are adjacent the condensed water chambers 25 and secured to the shell of the pressure vessel 1 at each axial end; moisture separators $3a$ and $3d$ are further mounted on the drain board 7 and fixed to axially extending vertical side partitions 9 that are shown in FIG. 2. The central moisture separators $3b$ and $3c$ are each mounted by being fixed to the partitions $6b$ that are in turn fixed to the shell of the pressure vessel 1, which partitions $6b$ further form a part of a steam passage leading from the steam inlet 12; the moisture separators $3b$ and $3c$ are further mounted and supported by the side partitions 9 and the bottom drain board 7. The above mentioned steam passage $6c$ has baffle plates 5 that are arcuate and arranged in an inverted V-shape, and are further provided with a plurality of holes 51 extending therethrough. In a similar manner, the baffle plates 4 associated with the steam separators $3a$ and $3d$ have a plurality of holes 41 and are fixed to the end plates 13 and the partitions $6a$ at their opposite ends. These baffle plates 4 are disposed between the steam inlets 14 at an oblique angle in the upper portions of the pressure vessel adjacent the moisture separators $3a$ and $3d$. The moisture separators $3a$–$3d$ each comprise a plurality of generally parallel evenly spaced corrugated plates 31 that are disposed to be axially extending as shown in FIG. 2. The drain board 7 is provided with a plurality of holes 71 and mounted generally horizontally within the lower portion of the vessel 1 so as to define a drain chamber 72 between the drain board 7 and the bottom most wall of the pressure vessel 1. A plurality of support members 8 assure this spacing between the drain board 7 and the pressure vessel 1.

OPERATION

Moisture laden steam from a high pressure turbine (not shown) may be divided into three portions $A_1$, $A_2$, $A_3$ (it is also contemplated that the steam may come from three separate turbines), and each portion is introduced into the pressure vessel 1 through respective steam inlets 12, 14. The moisture laden steam $A_1$ passes through a steam inlet 14 and reaches the steam separator $3a$ after the flow speed distribution of the steam $A_1$ has been regulated so as to be generally equal and uniform by the baffle plate 4; at the same time, a portion of the moisture contained within the steam $A_1$ is separated from the steam $A_1$ by the gravity of the moisture and the centrifugal force due to the turning of the steam flow from its downward direction to a generally horizontal direction to enter the steam separator $3a$; this separated moisture will flow down into the drain chamber 72 through the drain board 7. The steam $A_1$ must then pass through and between the corrugated plates 31 of the moisture separator $3a$, so that even very small moisture particles will be separated from the steam $A_1$; the thus separated moisture will flow down along the corrugated plates 31 of the separator $3a$ into the drain chamber 72. The moisture which is not separated from the steam $A_1$ and removed in the above process by the moisture separator $3a$ will be separated and removed by again turning the steam flow after leaving the moisture separator $3a$ from its generally horizontal direction to an upward vertical direction toward the tubes 21 of the adjacent heater 2, so that centrifugal force will again act upon the steam to remove the heavier moisture particles which will then pass through the drain board 7 to the chamber 72. Further, there is a large volume space defined by the moisture separators $3a$ and $3b$, the bottom of the heater 2, the drain board 7, and the adjacent walls of the pressure vessel 1, which large space or chamber will greatly decelerate the speed of the steam flow leaving the moisture separator $3a$ and prevent the small water particles from being carried upwardly by the steam flow. Such moisture particles that will not be carried upwardly by the deceleration of the steam will fall by gravity to pass through the drain board 7 into the drain chamber 72.

The thus dried, but still saturated steam $A_1$ obtained from the above process after passing through the separator $3a$ will then move upwardly through the heater 2, to pass between and through the heat exchange tubes 21, where the steam $A_1$ will be heated to a predetermined temperature so as to form superheated steam. The thus formed superheated steam will then pass through the steam outlet 11 to a low pressure turbine (not shown).

The steam $A_2$ that enters the opposite steam inlet at the other axial end of the pressure vessel will be dried, superheated and passed through the other steam outlet 11 in substantially the same manner as the steam $A_1$, since the structure at one end of the device of FIG. 1 is substantially a mirror image of the structure at the other end.

The moisture laden steam $A_3$ that is introduced into the pressure vessel 1 through the steam inlet 12 that is disposed in the central portion with respect to the vessel axis, will reach the passage $6c$ defined by the partitions $6b$, and at this point, the steam $A_3$ will be divided into two substantially equal steam flows by the baffle plates 5 which are symmetrically disposed in the lower portion of the passage $6c$. At the same time, the speed distribution of the steam flow will be regulated to be generally uniform and equal by means of the baffle plates 5 with their holes 51. Thereafter, the two steam flows will respectively pass through the moisture separators $3b$, $3c$, which will produce dried but still saturated steam, and will further pass upwardly to the steam heaters 2 for again producing superheated steam. In a manner similar to that previously mentioned, the steam will be dried by the centrifugal forces act upon the moisture particles as the steam changes direction as shown by the arrows and further dried by the deceleration as the steam enters the large chamber between the moisture separators and heaters 2. The respective steam flows that have been formed from the steam $A_3$ will join with the steam $A_1$, $A_2$ to jointly pass through the steam heaters 2. The joint steam is heated by the heaters 2 to be superheated steam for passage through the steam outlet to a low pressure turbine (not shown).

Live steam from an atomic reactor or steam extracted from a high pressure turbine is usually used as the heat exchange medium within the heaters 2 for providing the necessary heat to convert the dried but still saturated steam entering the heaters 2 to the superheated steam leaving the heaters 2. The heat exchange steam will enter steam chambers 24 by means of the steam inlets 26 to pass through the plates 22 into the inner axial ends of the heat exchange tubes 21, where they will transfer their heat through the tubes 21 to the dried but still saturated steam flows $A_1$, $A_2$ and $A_3$ to render them superheated steam. The heat exchange steam within the tubes 21 will be completely condensed by the time it reaches the tube sheets 22 adjacent the condensate chamber 25. The condensate will be collected within the water chamber 25 for exhaustion from the pressure vessel 1 through the drain conduit 27, which will preferably lead to a feed-water heater (not shown). Other types of heat exchange fluids may be used.

As the moisture is sufficiently separated and removed from the moisture laden steam before the steam enters the heaters 2, the thermal efficiency of the unit is raised. In addition, it is seen that with the present construction it is easy to construct the number of outlets 11 for the superheated steam to correspond to the number of inlets for supplying the superheated steam to low pressure turbines, so that the piping to the low pressure turbines becomes quite simple.

While a preferred embodiment of the present invention has been set forth in detail for purposes of illustration and with respect to the details important in their own right, further embodiments, modifications and variations are contemplated within the spirit and scope of the present invention as defined by the following claims.

What is claimed is:

1. A steam heating apparatus with moisture separators, comprising: an elongated tubular shell having a pair of opposite axial end plates for effectively closing the respective ends of the tubular shell; a plurality of steam heaters each disposed substantially parallel with the axis of the tubular shell and in the upper portion of said tubular shell; each of said steam heaters having a plurality of generally axially extending heat exchange tubes, inlet means for introducing a heat exchange fluid into said plurality of said tubes, and fluid outlet means for exhausting the heat exchange fluid from the opposite ends of said tubes; a plurality of moisture separators disposed in the lower portion of said tubular shell respectively adjacent the axial ends of said steam heaters; a plurality of inlets provided on said shell structure adjacent to the axial ends of said steam heaters for introducing moisture laden steam; steam outlets for passing steam from the tubular shell to the exterior; and passage means for conducting the steam from said steam inlets through said moisture separators, through said steam heaters, and through said steam outlets serially in order.

2. The apparatus of claim 1, including a plurality of baffle plate means provided serially in the steam flow between said inlets and said moisture separators, respectively, for equalizing the steam speed distribution reaching the moisture separators across the flow cross section of the moisture separators.

3. The apparatus of claim 1, including a perforated drain board disposed in the lowermost portion of said tubular shell to define with a portion of said tubular shell and said end plates a lower drain chamber for receiving condensate from the moisture laden steam.

4. The apparatus of claim 3, wherein said passage means includes a passage extending vertically downward between two axially adjacent steam heaters and having therein two of said baffle plate means forming an inverted V-shaped perforated baffle to divide the steam flow into two separate steam flows respectively leading to two separate steam moisture separators.

5. The apparatus of claim 4, wherein said steam outlets for the superheated steam leaving the steam heaters are each disposed in said tubular shell respectively over a central portion of each of said steam heaters.

6. The apparatus of claim 1, including at least two of said steam heaters being axially adjacent each other and axially aligned with parallel horizontal heat exchange tubes, adjacent inner heat exchange fluid chamber means for providing fluid communication of heat exchange fluid with said heat exchange tubes respectively at one end of said heat exchange tubes, and heat exchange fluid chambers at the opposite ends of said heat exchange tubes on the outer axial ends of said adjacent steam heaters for providing fluid communication of heat exchange fluid after it has passed in heat exchange relationship through said heat exchange tubes with said chambers being respective inlet and outlet chambers; a portion of said passage means having a steam inlet extending vertically downward through said tubular shell between said adjacent steam heaters and having therein flow dividing means for separating the downward inlet moisture laden steam flow into two flows redirected axially away from each other in the lower portion of said tubular shell; two of said moisture separators each respectively being immediately below and adjacent said heat exchange fluid chamber means for horizontally receiving therethrough said separated steam flows; and said passage means further changing the steam flow direction leaving said steam separators to an upward direction for passing through said steam heaters.

7. The apparatus of claim 6, wherein at least two of said steam outlets are each respectively immediately vertically above the central portion of said adjacent steam heaters; and further wherein each of said end plates includes, in its upper portion, one of said steam inlets for directing moisture laden inlet steam from the upward portion downwardly into said tubular shell, and said passage means further guiding the inlet steam from said end plate inlets to change its direction to a horizontal flow through respective ones of said steam separators located immediately below and adjacent said heat exchange fluid chambers, and further redirecting the generally horizontal steam flow passing from said last mentioned moisture separators upwardly to pass vertically through said axially adjacent steam heaters.

8. The apparatus of claim 7, including a generally horizontally extending drain board in the bottom most portion of said tubular shell supporting thereon said steam separators and being perforated to pass condensate from its upper side to its lower side, which lower side forms with the lowermost portions of said tubular shell and end plates a condensate drain chamber, and further including condensate drain means leading from said drain chamber.

9. The apparatus of claim 7, further including perforated baffle plates respectively located in fluid flow between respective ones of said steam inlets and moisture separators to constitute means for evenly distributing the inlet steam flow through said moisture separators.

10. The apparatus of claim 6, including a generally horizontally extending drain board in the bottom most portion of said tubular shell supporting thereon said steam separators and being perforated to pass condensate from its upper side to its lower side, which lower side forms with the lowermost portions of said tubular shell and end plates a condensate drain chamber, and further including condensate drain means leading from said drain chamber.

* * * * *